(12) United States Patent
Zheng

(10) Patent No.: US 12,304,679 B2
(45) Date of Patent: May 20, 2025

(54) CUSHIONING MECHANISM, HEAT SEALING DEVICE, AND FILM WRAPPING MACHINE

(71) Applicant: TAIWAN HIGHDREAM INTELLECTUALIZED MACHINERY CO., LTD., Taichung (TW)

(72) Inventor: Ying Zheng, Taichung (TW)

(73) Assignee: TAIWAN HIGHDREAM INTELLECTUALIZED MACHINERY CO., LTD., Taichung (TW)

( * ) Notice: Subject to any disclaimer, the term of this patent is extended or adjusted under 35 U.S.C. 154(b) by 34 days.

(21) Appl. No.: 18/396,336

(22) Filed: Dec. 26, 2023

(65) Prior Publication Data

US 2024/0343436 A1    Oct. 17, 2024

(30) Foreign Application Priority Data

Apr. 17, 2023 (CN) .......................... 202320847040.4

(51) Int. Cl.
*B65B 51/16* (2006.01)
*B65B 11/02* (2006.01)

(52) U.S. Cl.
CPC ............ *B65B 51/16* (2013.01); *B65B 11/025* (2013.01)

(58) Field of Classification Search
None
See application file for complete search history.

(56) References Cited

U.S. PATENT DOCUMENTS

| | | | | | |
|---|---|---|---|---|---|
| 3,545,171 | A | * | 12/1970 | Salomon | B65B 51/16 53/562 |
| 6,449,928 | B1 | * | 9/2002 | Huson | B65B 11/025 53/566 |
| 2012/0313305 | A1 | * | 12/2012 | Knobloch | F16F 9/0209 267/126 |
| 2023/0158755 | A1 | * | 5/2023 | Totani | B29C 65/305 156/583.1 |

* cited by examiner

*Primary Examiner* — Chinyere J Rushing-Tucker
(74) *Attorney, Agent, or Firm* — Birch, Stewart, Kolasch & Birch, LLP

(57) ABSTRACT

A cushioning mechanism of a heat sealing device applied in a film wrapping machine has a leading cylinder, an elastic unit, a first cushioning plate, a second cushioning plate, and a cushioning component. The elastic unit, the first cushioning plate, and the second cushioning plate are sequentially disposed on the leading cylinder along an axial direction of the leading cylinder; the first cushioning plate and the leading cylinder rotate synchronously. The cushioning component has a cushioning groove and a cushioning protrusion respectively formed on the first cushioning plate and the second cushioning plate. When the second cushioning plate is rotated, the cushioning protrusion presses one of two groove walls of the cushioning groove such that the first cushioning plate can rotate synchronously with the second cushioning plate for transmission or move relative to the leading cylinder to compress the elastic unit for cushioning.

18 Claims, 11 Drawing Sheets

CUSHIONING MECHANISM, HEAT SEALING DEVICE, AND FILM WRAPPING MACHINE

BACKGROUND

1. Field of the Invention

The present invention relates to a heat sealing device in a film wrapping machine, and particularly to a cushioning mechanism, a heat sealing device, and a film wrapping machine.

2. Description of Related Art

When packing, a film wrapping machine grips and heats up a wrapping film by two gripping boards of a heat sealing device to connect and seal edges of the wrapping film. To keep the two gripping boards tightly gripping the wrapping film and prevent a driver for driving the two gripping boards from overloading, the heat sealing device needs to have a cushioning mechanism.

A conventional cushioning mechanism in the heat sealing device of the film wrapping machine often has multiple tension springs and components for mounting the multiple tension springs; specifically, the multiple tension springs are disposed circularly along a circumference direction of a transmission wheel being a gear or a belt pulley. When the driver continues to operate after the two gripping boards tightly grip the wrapping film, elasticity of the multiple tension springs provide a cushioning effect and prevent the driver from overloading.

However, the conventional cushioning mechanism needs the multiple tension springs for elastic cushioning; thereby, more components need to be manufactured and processed for mounting the multiple tension springs. Further, mounting and positioning of the multiple tension springs is cumbersome. Therefore, the conventional cushioning mechanism is time-consuming and inconvenient in use.

SUMMARY

To overcome the shortcomings of the conventional cushioning mechanism of the heat sealing device in the film wrapping machine, the present invention provides a cushioning mechanism, a heat sealing device, and a film wrapping machine which operate without the multiple tension springs and are easier to be mounted and maintained.

The cushioning mechanism provided by the present invention is characterized in that the cushioning mechanism comprises a leading cylinder, an elastic unit, a first cushioning plate, a second cushioning plate, and at least one cushioning component. The elastic unit is elastically deformable under compression. The first cushioning plate rotates synchronously with the leading cylinder. The at least one cushioning component has a cushioning groove and a cushioning protrusion matching the cushioning groove. The cushioning groove has a first groove wall and a second groove wall located on two opposite sides of the cushioning groove. The first groove wall extends from a bottom of the cushioning groove and along an axial direction of the leading cylinder, and the second groove wall extends from the bottom of the cushioning groove and extends obliquely relative to the axial direction of the leading cylinder. The elastic unit, the first cushioning plate, and the second cushioning plate are sequentially disposed on the leading cylinder along the axial direction of the leading cylinder, and two opposite ends of the elastic unit respectively abut the first cushioning plate and the leading cylinder. The cushioning groove and the cushioning protrusion are respectively formed on the first cushioning plate and the second cushioning plate. When the second cushioning plate is rotated to allow the cushioning protrusion to press the first groove wall, the first cushioning plate, the second cushioning plate, and the leading cylinder rotate synchronously; when the second cushioning plate is rotated to allow the cushioning protrusion to press the second groove wall, the second cushioning plate rotates relative to the first cushioning plate and pushes the first cushioning plate to move along the axial direction of the leading cylinder and compress the elastic unit.

For the cushioning mechanism as described above, the cushioning mechanism has multiple said cushioning components.

For the cushioning mechanism as described above, the first cushioning plate and the second cushioning plate are made of self-lubricating material.

For the cushioning mechanism as described above, the cushioning mechanism has an elastic ring disposed between and abutting against the first cushioning plate and the second cushioning plate.

The heat sealing device provided by the present invention is characterized in that the heat sealing device comprises a driver, two gripping boards, a transmission mechanism, and the cushioning mechanism as described above. The transmission mechanism is connected to the driver and the two gripping boards and has a transmission wheel and a transmission shaft. The transmission wheel is configured to be rotated by the driver, and the transmission shaft is configured to drive the two gripping boards to approach each other or depart from each other. The second cushioning plate and the transmission wheel rotate synchronously, and the leading cylinder and the transmission shaft rotate synchronously.

The film wrapping machine provided by the present invention is characterized in that the film wrapping machine comprises the heat sealing device as described above.

By means of the aforementioned technical features, the present invention provides efficacy as follows: the present invention provides the cushioning mechanism, the heat sealing device, and the film wrapping machine of the present invention, wherein the cushioning mechanism has the leading cylinder, the first cushioning plate, the second cushioning plate, the elastic unit, and the cushioning component between the first cushioning plate and the second cushioning plate for cushioning; thereby, the two gripping boards of the heat sealing device can grip a wrapping film tightly and continuously for a period of time, and the driver for driving the two gripping boards can also be prevented from overloading. Compared to the conventional cushioning mechanism which requires mounting and positioning multiple tension springs for cushioning, the cushioning mechanism of the present invention has simple configurations and is more convenient to be mounted and maintained.

DETAILED DESCRIPTION OF THE PREFERRED EMBODIMENT

Figure 1:
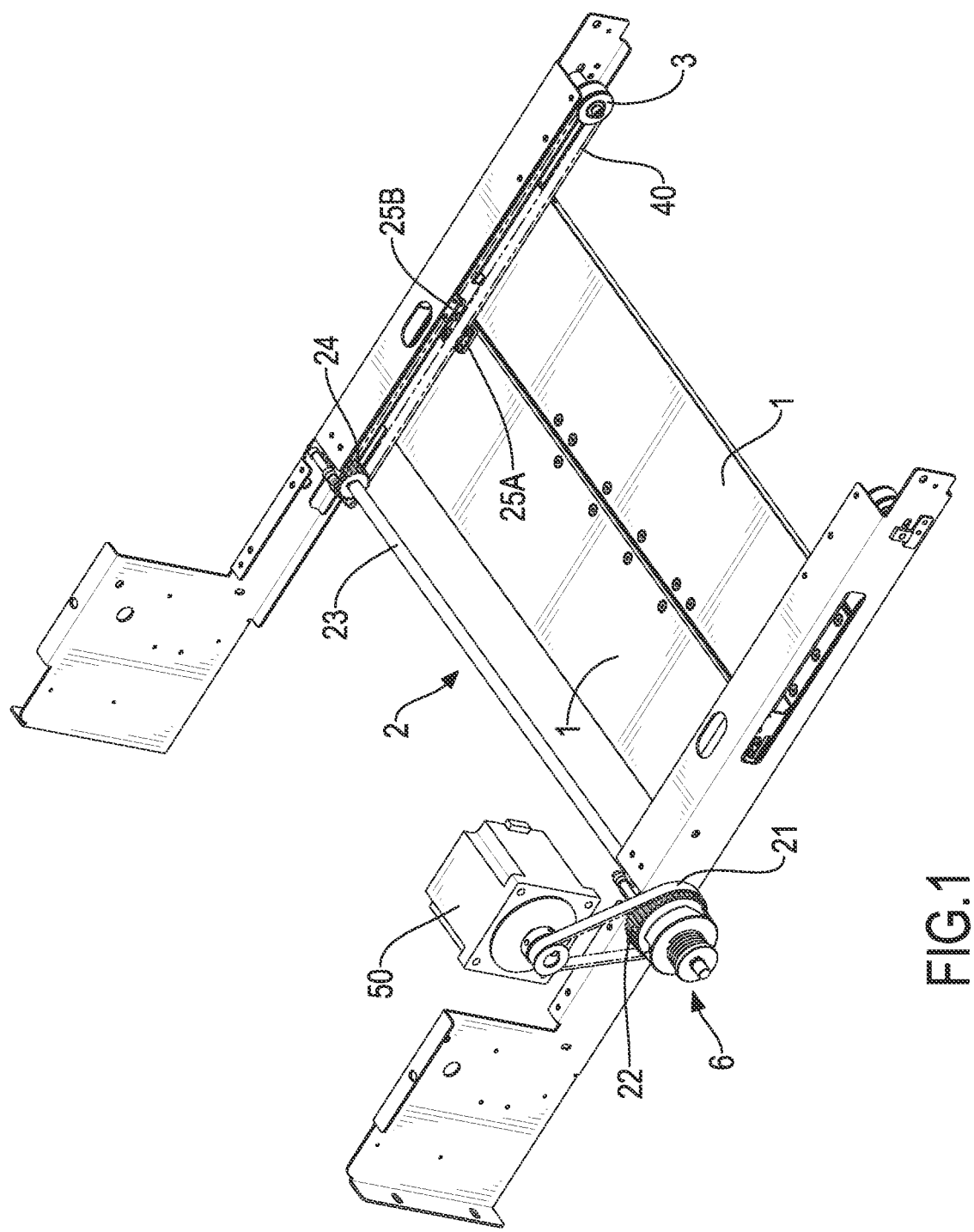
FIG. 1 is a perspective view of a heat sealing device of a preferred embodiment in accordance with the present invention.

To understand the technical features of the present invention and utility effects thereof and enable the present invention according to the specification, detailed descriptions of preferred embodiments shown in the drawings are hereinafter described.

Figure 2:
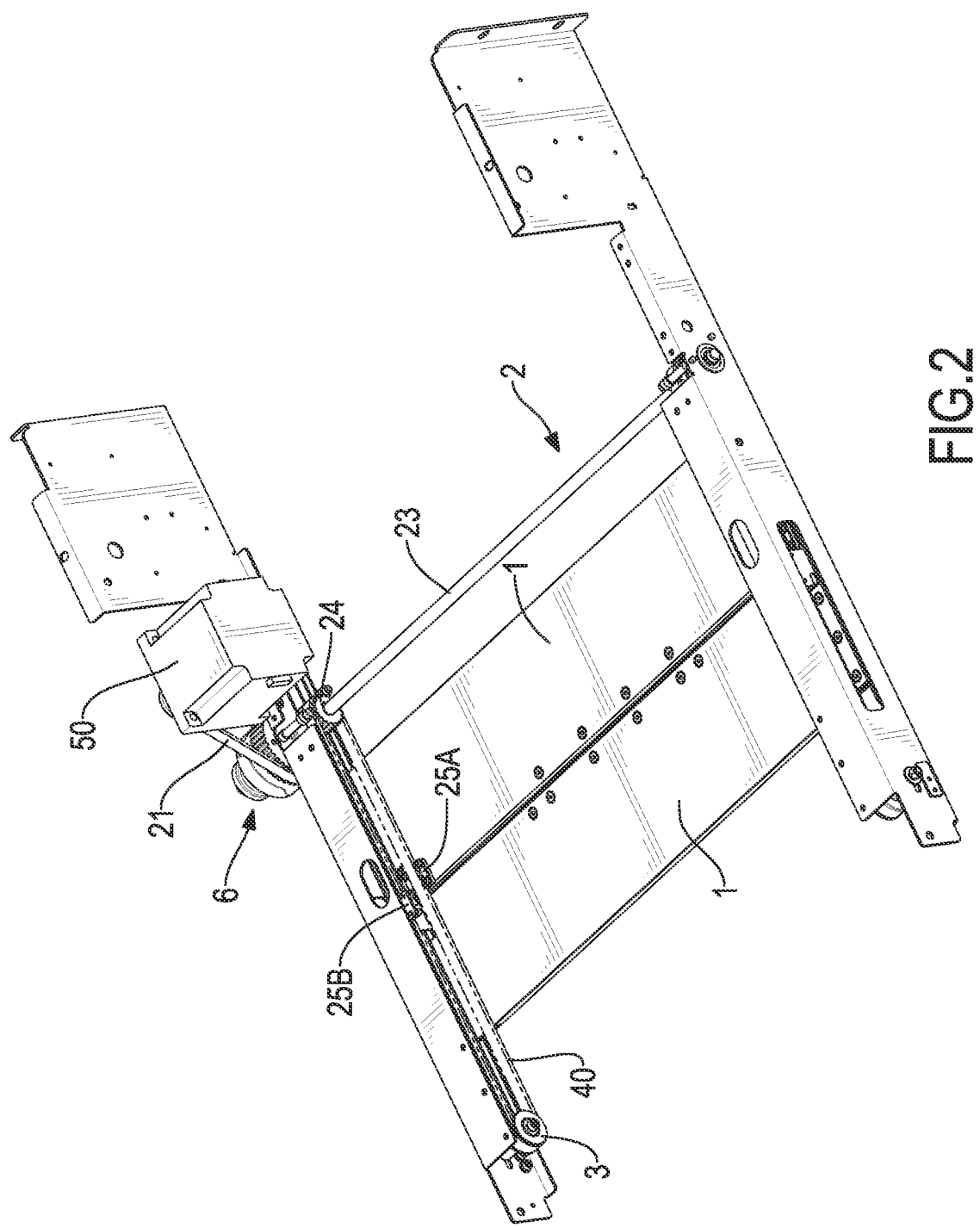
FIG. 2 is another perspective view of the heat sealing device in FIG. 1.
Figure 3:
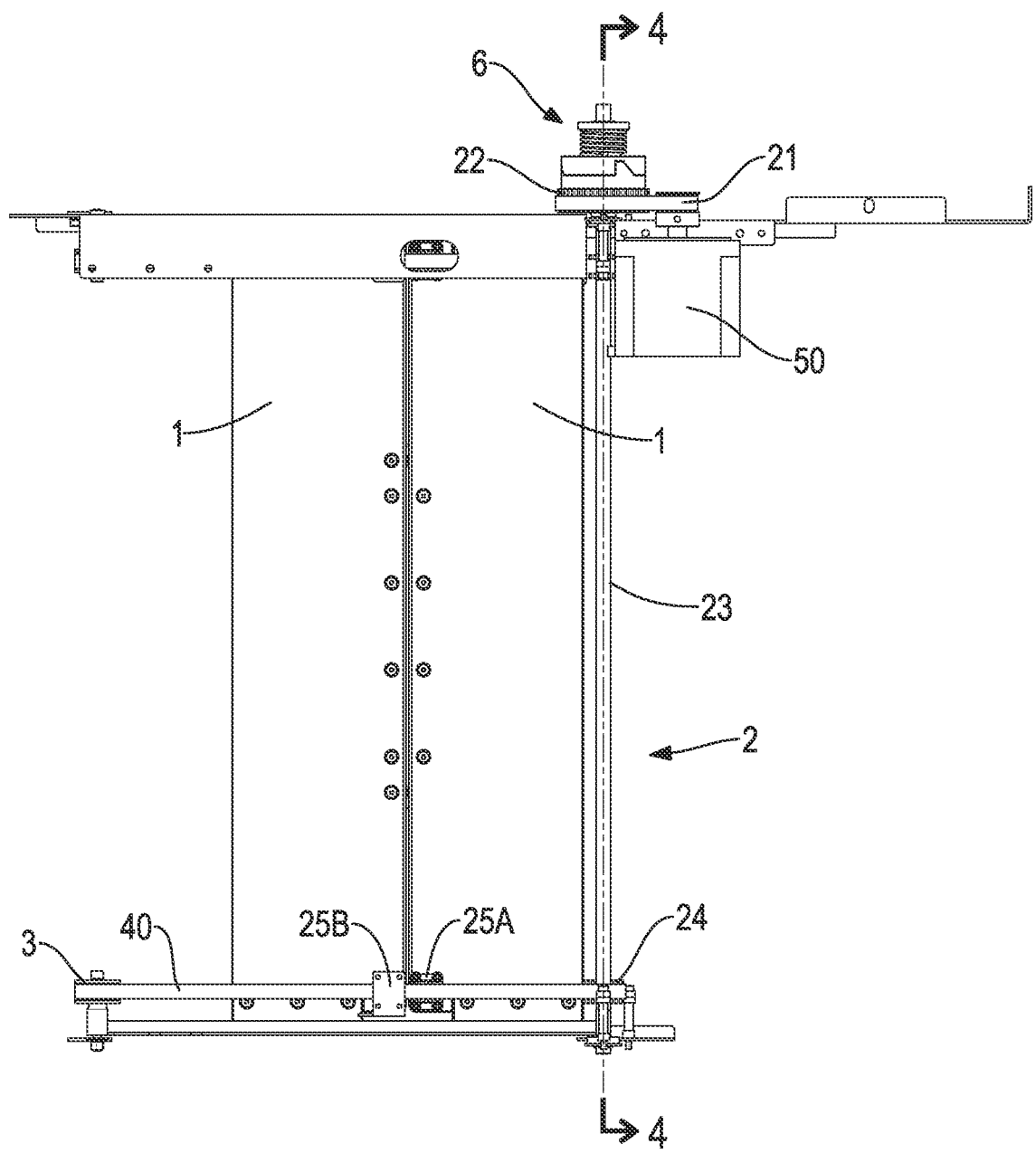
FIG. 3 is a top side view of the heat sealing device in FIG. 1.
Figure 4:
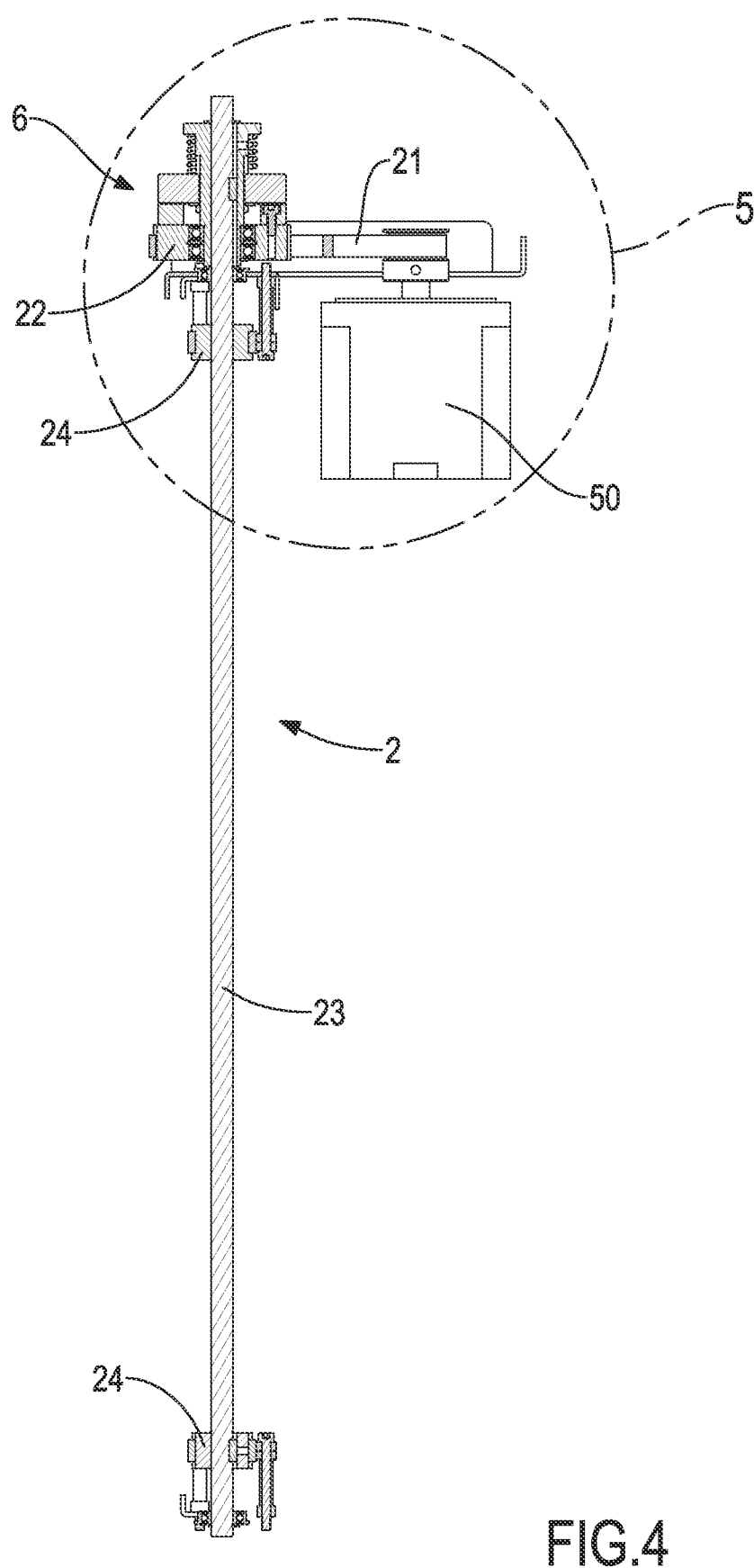
FIG. 4 is a sectional side view of the heat sealing device across line 4-4 in FIG. 3.
Figure 5:
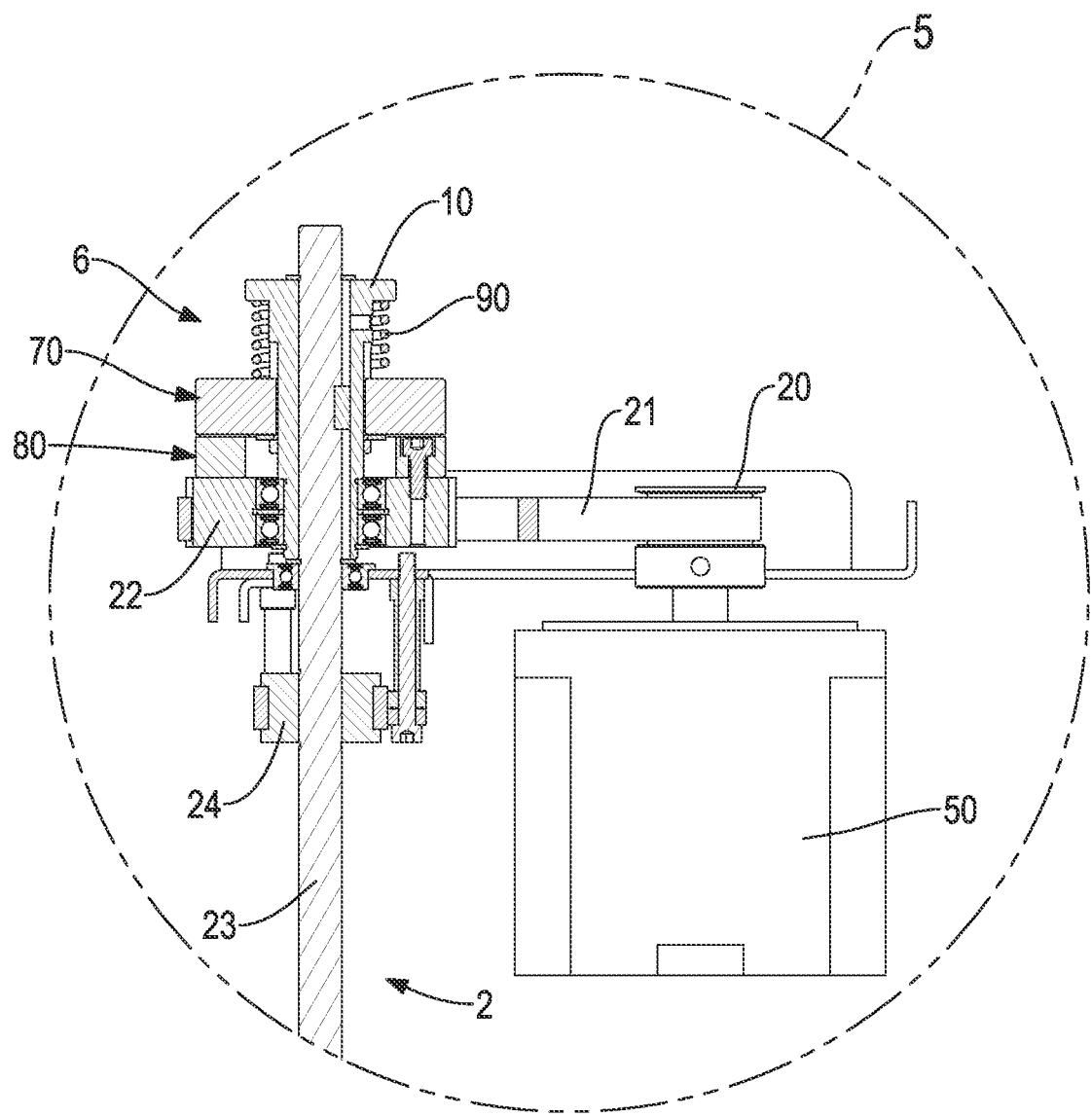
FIG. 5 is an enlarged view of the circled area 5 in FIG. 4.
Figure 11:
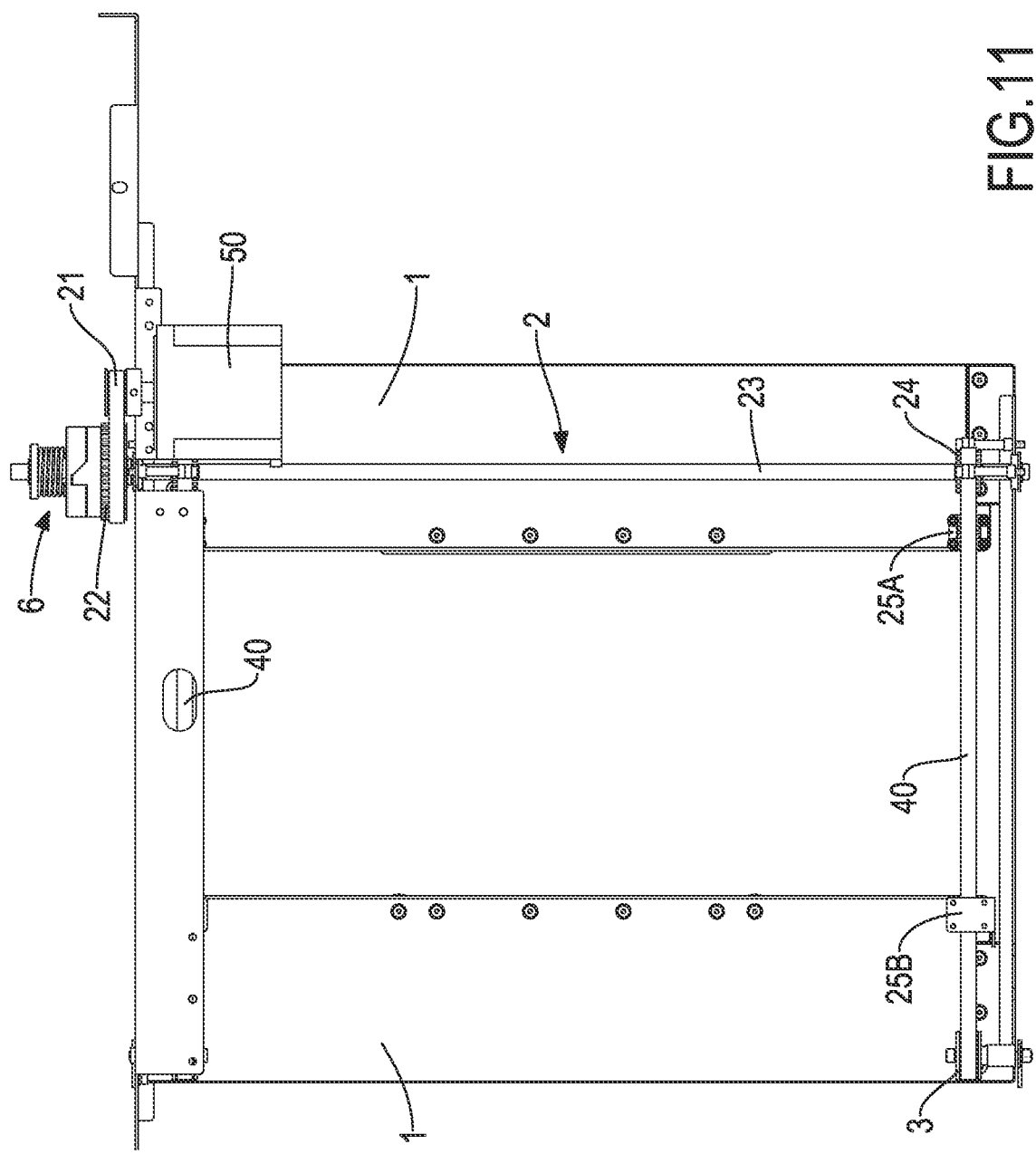
FIG. 11 is an operational view of the heat sealing device in FIG. 1.

With reference to FIGS. 1 and 2, a heat sealing device of a preferred embodiment in accordance with the present invention has two gripping boards 1, a transmission mechanism 2, a driver 50, and a cushioning mechanism 6. The transmission mechanism 2 is connected to the driver 50 and the two gripping boards 1 such that the two gripping boards 1 are driven by the driver 50 to approach each other as shown in FIG. 3 or depart from each other as shown in FIG. 11. The transmission mechanism 2 has a transmission wheel 22 and a transmission shaft 23, and the transmission wheel 22 connects the driver 50 and the transmission shaft 23. With reference to FIGS. 3 to 5, the cushioning mechanism 6 is disposed on the transmission wheel 22 and is utilized for cushioning and reducing the loading of the driver 50 when the two gripping boards 1 tightly grip a wrapping film.

Specifically, the transmission mechanism 2 has a driving wheel 20, a transmission belt 21, the transmission wheel 22, the transmission shaft 23, two first synchronous pulleys 24, two second synchronous pulleys 3, and two synchronous belts 40. The driving wheel 20 is disposed on an output shaft of the driver 50, and the transmission belt 21 is connected to the driving wheel 20 and the transmission wheel 22. The transmission wheel 22 is disposed on the transmission shaft 23 and is configured to rotate synchronously with or relative to the transmission shaft 23 via the cushioning mechanism 6. The two first synchronous pulleys 24 are disposed on the transmission shaft 23 and rotate synchronously with the transmission shaft 23. Each one of the two synchronous belts 40 is connected to a respective one of the two first synchronous pulleys 24 and a respective one of the two second synchronous pulleys 3. With the configurations described above, when the driver 50 starts to operate, the two synchronous belts 40 drive the two gripping boards 1 to approach or depart from each other. More specifically, with reference to FIGS. 1 and 2, the transmission mechanism 2 has two first connecting boards 25A and two second connecting boards 25B, and each one of the two synchronous belts 40 has an upper section and a lower section. Each one of the first connecting boards 25A is fixed on the lower section of a respective one of the two synchronous belts 40 and is fixed on one of the two gripping boards 1, and each one of the two second connecting boards 25B is fixed on the upper section of a respective one of the two synchronous belts 40 and is fixed on the other one of the two gripping boards 1.

Figure 6:
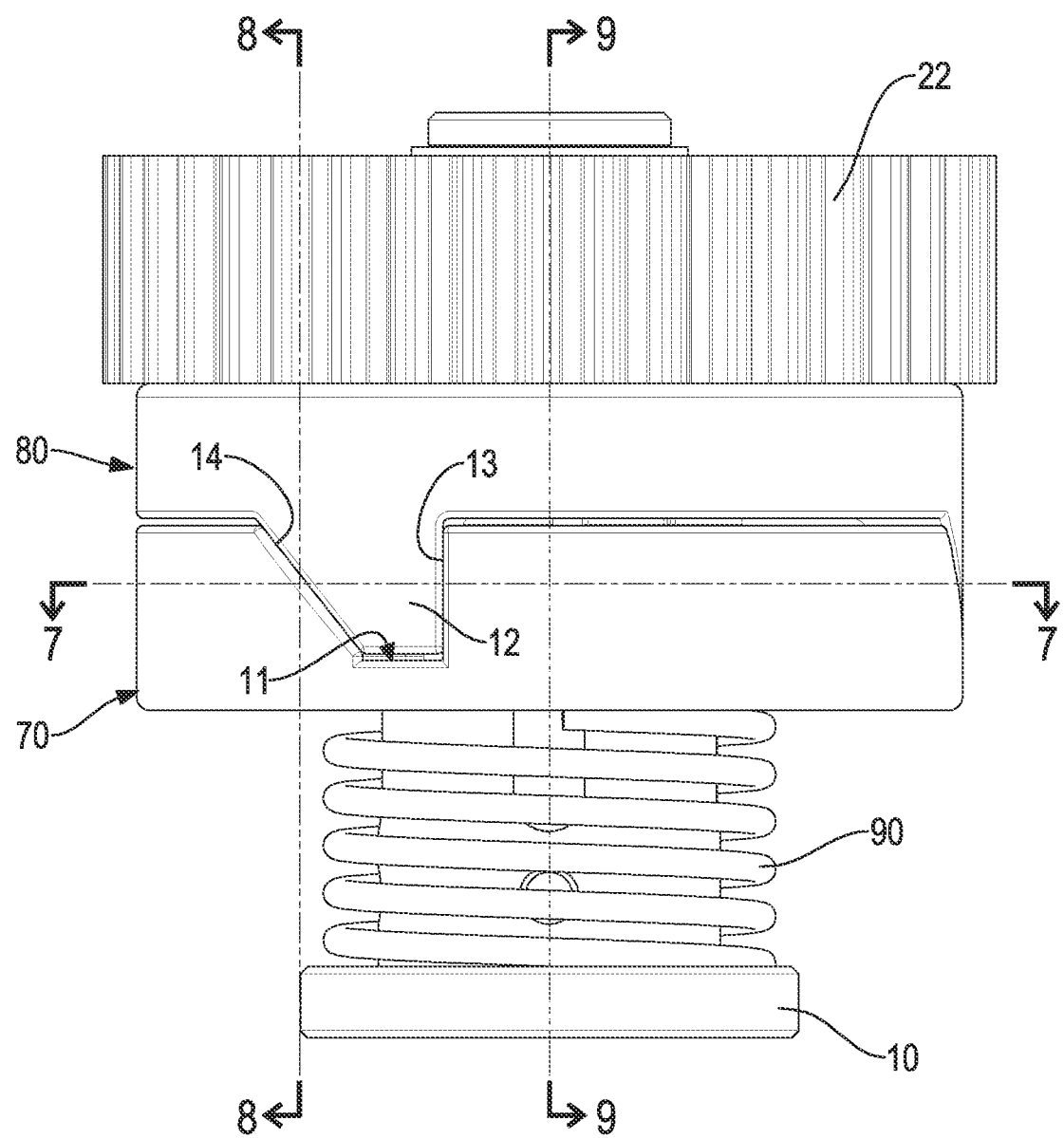
FIG. 6 is a side view of a cushioning mechanism of the heat sealing device in FIG. 1.
Figure 10:
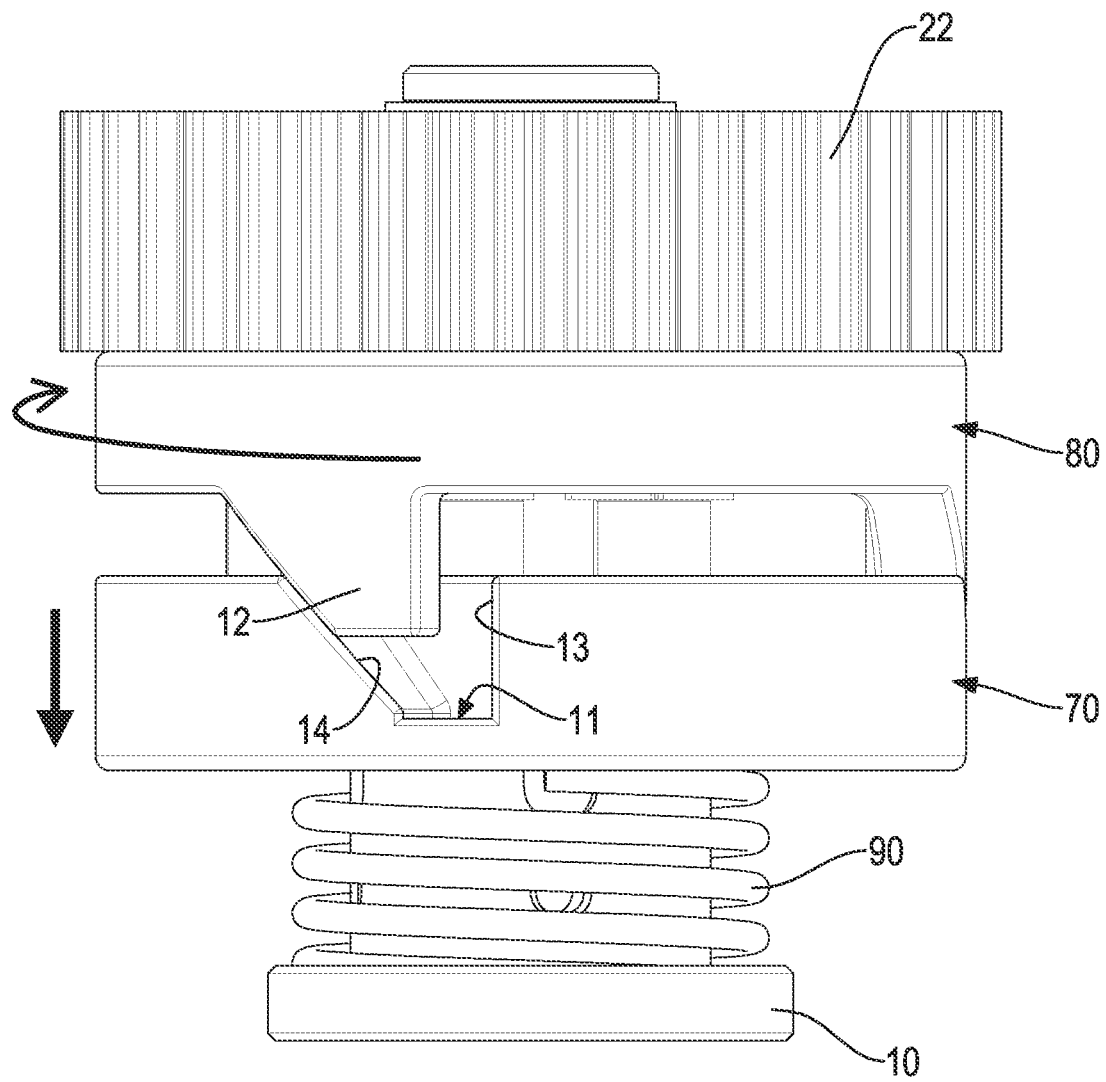
FIG. 10 is an operational view of the cushioning mechanism of the heat sealing device in FIG. 1.

With reference to FIGS. 5 and 6, the cushioning mechanism 6 has a leading cylinder 10, a first cushioning plate 70, a second cushioning plate 80, an elastic unit 90 and at least one cushioning component. Said cushioning component has a cushioning groove 11 and a cushioning protrusion 12 matching and accommodated in the cushioning groove 11. The leading cylinder 10 is fixed to the transmission shaft 23, and the elastic unit 90, the first cushioning plate 70, and the second cushioning plate 80 are sequentially disposed on the leading cylinder 10 along an axial direction of the leading cylinder 10. The first cushioning plate 70 rotates synchronously with the leading cylinder 10 and is configured to move relative to the leading cylinder 10 along the axial direction of the leading cylinder 10. The cushioning groove 11 and the cushioning protrusion 12 are respectively formed on the first cushioning plate 70 and the second cushioning plate 80 such that the first cushioning plate 70 and the second cushioning plate 80 are configured to rotate synchronously or relatively. Two opposite ends of the elastic unit 90 respectively abut the first cushioning plate 70 and the leading cylinder 10. The second cushioning plate 80 is fixed to the transmission wheel 22 by bolts. With reference to FIGS. 6 and 10, when the second cushioning plate 80 rotates relative to the first cushioning plate 70, the second cushioning plate 80 pushes the first cushioning plate 70 to move along the axial direction of the leading cylinder 10 and compress the elastic unit 90 to achieve an effect of cushioning.

Figure 7:
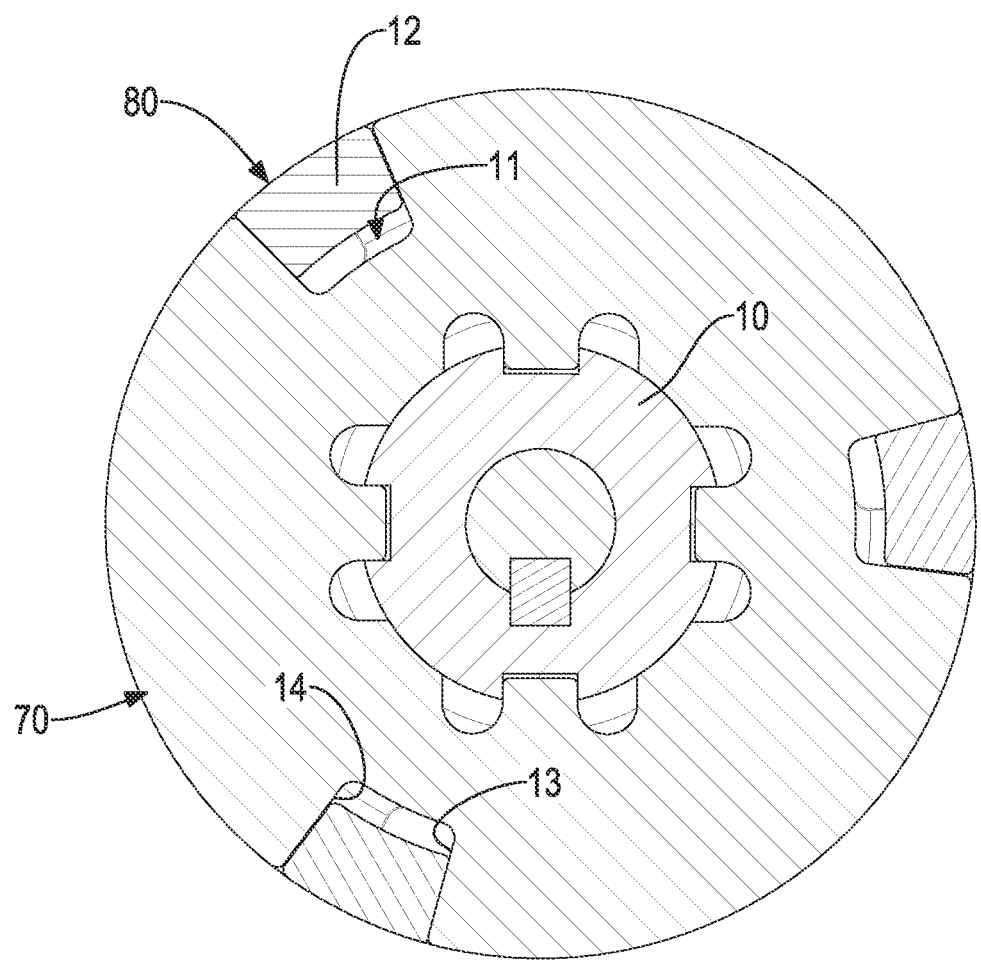
FIG. 7 is a sectional top side view of the cushioning mechanism across line 7-7 in FIG. 6.

Specifically, the cushioning groove 11 has a first groove wall 13 and a second groove wall 14 respectively located on two opposite sides of the cushioning groove 11. The first groove wall 13 extends from a bottom of the cushioning groove 11 along an axial direction of the leading cylinder 10, and the second groove wall 14 extends from a bottom of the cushioning groove 11 and extends obliquely relative to the axial direction of the leading cylinder 10. When the driver 50 drives the two gripping boards 1 to depart from each other as shown in FIG. 11, the transmission wheel 22 and the second cushioning plate 80 rotate synchronously; with reference to FIG. 6, the cushioning protrusion 12 moves toward a right side of FIG. 6 and presses the first groove wall 13 of the cushioning groove 11 on the first cushioning plate 70 such that the first cushioning plate 70 and the second cushioning plate 80 rotate synchronously. With reference to FIG. 7, since the first cushioning plate 70 and the leading cylinder 10 rotate synchronously, the transmission shaft 23 and the leading cylinder 10 rotate synchronously with the first cushioning plate 70 such that the cushioning mechanism 6 allows the transmission wheel 22 and the transmission shaft 23 to transmit and allows the two gripping boards 1 to be driven by the driver 50 to depart from each other.

When the driver 50 continues to operate after the two gripping boards 1 approach each other and tightly grip the wrapping film, the transmission wheel 22 and the second cushioning plate 80 are driven by the driver 50 to rotate synchronously. With reference to FIG. 6, the cushioning protrusion 12 moves toward a left side of FIG. 6 and presses the second groove wall 14 of the cushioning groove 11 on the first cushioning plate 70; since the two gripping boards 1 cannot approach each other anymore, the transmission shaft 23, the leading cylinder 10, and the first cushioning plate 70 cannot be rotated anymore; with reference to FIG. 10, instead, the first cushioning plate 70 is pushed by the second cushioning plate 80 to move relative to the leading cylinder 10 along the axial direction of the leading cylinder 10 due to the second groove wall 14 extending obliquely, and the first cushioning plate 70 compresses the elastic unit 90 such that the cushioning mechanism 6 achieves the effect of cushioning.

In use, the driver 50 first drives the two gripping boards 1 to depart from each other by the transmission of the transmission mechanism 2 as shown in FIG. 11 so as to allow a wrapping film to be located between the two gripping boards 1. In a heat sealing process later, the driver 50 drives the two gripping boards 1 to approach each other and grip the wrapping film by the transmission of the transmission mechanism 2 as shown in FIG. 3. Afterwards, the driver 50 continues to operate to maintain the two gripping boards 1 tightly gripping the wrapping film. When the driver 50 continues to operate and rotate the transmission wheel 22, since the two gripping boards 1 already tightly grip the wrapping film, the transmission shaft 23 cannot be rotated anymore; the transmission wheel 22 and the second cushioning plate 80 fixed to the transmission wheel 22 rotate relative to the transmission shaft 23 and the leading cylinder 10 fixed to the transmission shaft 23. With reference to FIG. 10, when the second cushioning plate 80 rotates relative to the leading cylinder 10 and the first cushioning plate 70, the second cushioning plate 80 pushes the first cushioning plate 70 to compresses the elastic unit 90; an elastic deformation of the compressed elastic unit 90 provides the effect of cushioning and prevents the driver 50 from overloading. After the heat sealing process, the first cushioning plate 70 restores to an original position due to a restoring force of the elastic unit 90, and the driver 50 again drives the two gripping boards 1 to depart from each other.

The present invention provides the heat sealing device and the cushioning mechanism 6 thereof, wherein the cushioning mechanism 6 has the leading cylinder 10, the first cushioning plate 70, the second cushioning plate 80, the elastic unit 90, and the cushioning component on the first cushioning plate 70 and the second cushioning plate 80 for cushioning. Thereby, the two gripping boards 1 can grip the wrapping film tightly and continuously for a period of time, and the driver 50 can also be prevented from overloading. Compared to the conventional cushioning mechanism which needs to mount and position multiple tension springs for cushioning, the cushioning mechanism 6 in the present invention has simple construction and is convenient for mounting and maintenance.

In the preferred embodiment, the transmission mechanism 2 has the driving wheel 20, the transmission belt 21, the transmission wheel 22, the transmission shaft 23, the two first synchronous pulleys 24, the two second synchronous pulleys 3, and the two synchronous belts 40 to transmit and allow the driver 50 to drive the two gripping board 1. In other embodiments, the transmission mechanism 2 may transmit with different configurations, e.g., the driving wheel 20 and the transmission wheel 22 may adopt gears and be engaged with each other, and the transmission belt 21 can be omitted. As long as the transmission mechanism 2 has the transmission wheel 22 for the second cushioning plate 80 to be fixed to and the transmission shaft 23 to rotate synchronously with the leading cylinder, wherein the transmission wheel 22 and the transmission shaft 23 are configured to rotate relatively or synchronously, the cushioning mechanism 6 can perform cushioning during the heat sealing process; the configuration of the transmission mechanism 2 is not limited to the preferred embodiment.

With reference to FIGS. 6 to 8 and 10, in the preferred embodiment, the cushioning groove 11 is formed on the first cushioning plate 70, and the cushioning protrusion 12 is formed on the second cushioning plate 80. In other embodiments, the cushioning groove 11 can be formed on the second cushioning plate 80 with the cushioning protrusion 12 formed on the first cushioning plate 70, which still allows the cushioning mechanism 6 to perform transmission and cushioning. Configuration of the second cushioning plate 80 pushing the first cushioning plate 70 is not limited to the preferred embodiment.

Figure 8:
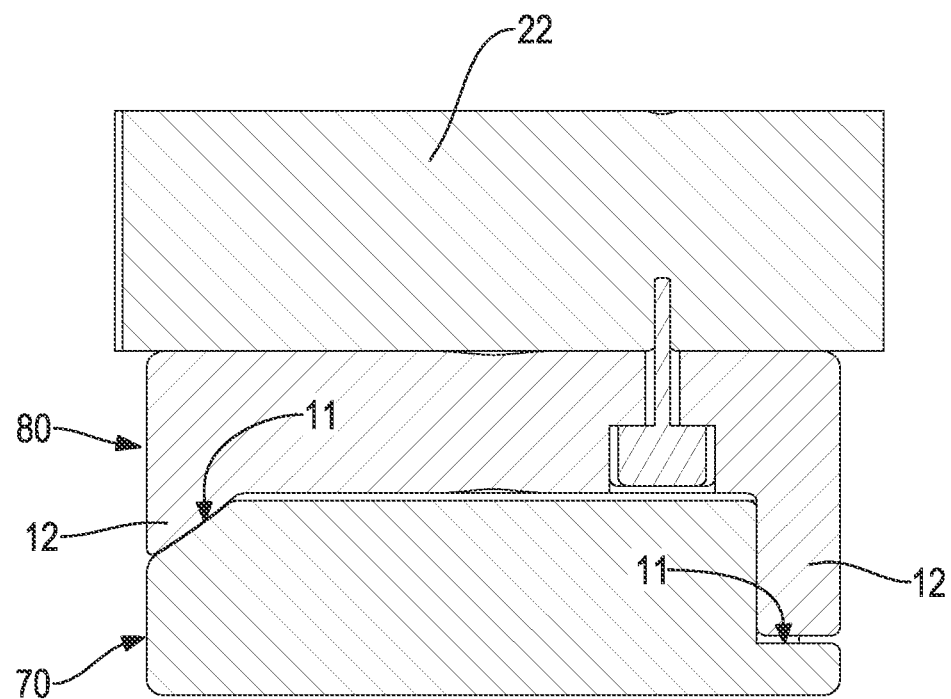
FIG. 8 is a sectional side view of the cushioning mechanism across line 8-8 in FIG. 6.

With reference to FIGS. 7 and 8, in the preferred embodiment, the cushioning mechanism 6 has multiple said cushioning components. Said cushioning grooves 11 of the multiple cushioning components are arranged on the first cushioning plate 70 at equal angular intervals, and said cushioning protrusions 12 of the multiple cushioning components are arranged on the second cushioning plate 80 at equal angular intervals. By the cushioning grooves 11 and the cushioning protrusions 12 of the multiple cushioning components, forces acted between the first cushioning plate 70 and the second cushioning plate 80 can be evenly distributed, which further ensures working stability of the first cushioning plate 70 and the second cushioning plate 80.

In the preferred embodiment, the first cushioning plate 70 and the second cushioning plate 80 are plates made of a self-lubricating material, which prolongs service lives of the first cushioning plate 70 and the second cushioning plate 80. Specifically, the self-lubricating material may be one of Polytetrafluoroethylene (PTFE), Polyimide (PI), Polyetheretherketone (PEEK), Polyphenylene Sulfide (PPS), Polyamide (PA), Polyoxymethylene (POM), and Ultra High Molecular Weight Polyethylene (UHMWPE).

Figure 9:
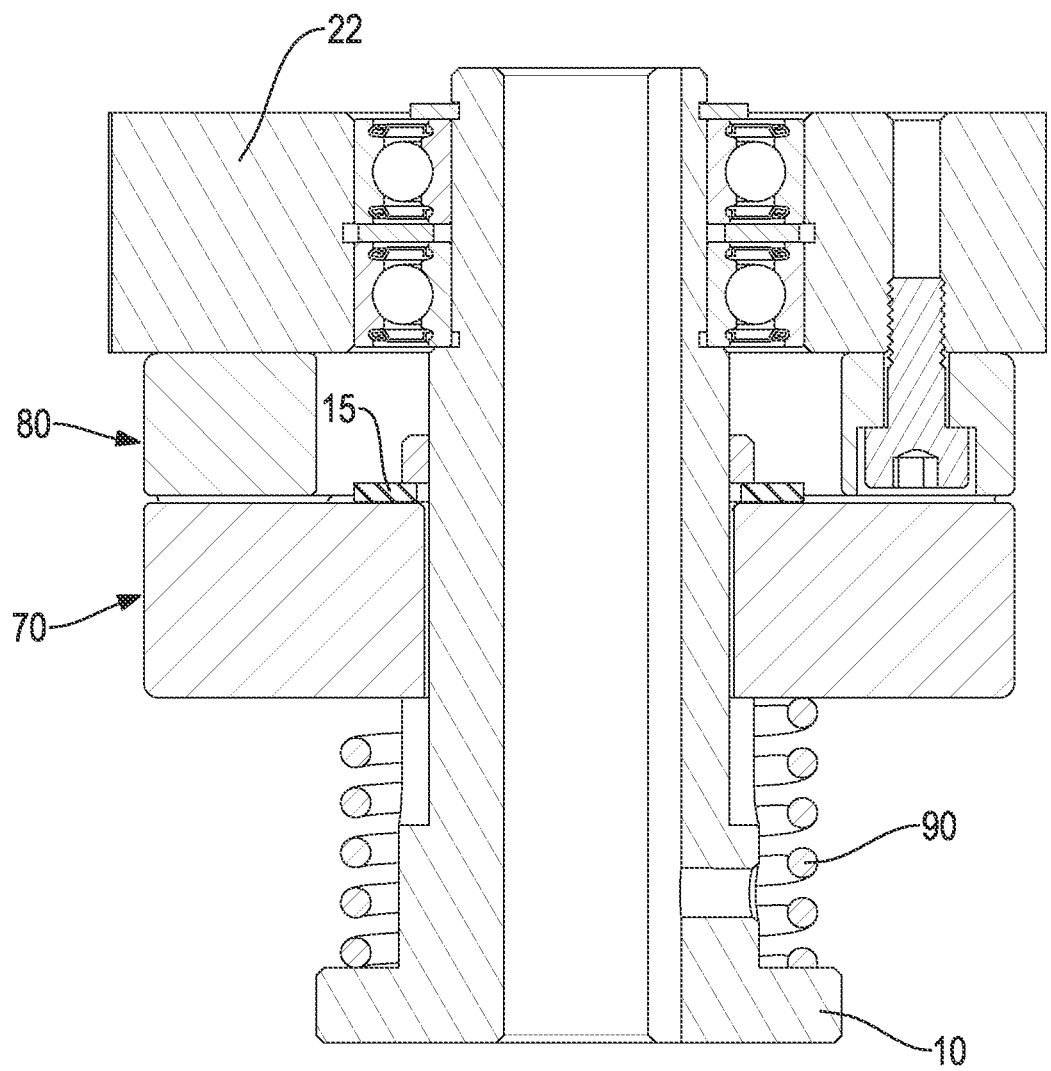
FIG. 9 is a sectional side view of the cushioning mechanism across line 9-9 in FIG. 6.

With reference to FIG. 9, in the preferred embodiment, the cushioning mechanism 6 has an elastic ring 15 disposed between and abutting the first cushioning plate 70 and the second cushioning plate 80. The elastic ring 15 limits the first cushioning plate 70 when the first cushioning plate 70 is pushed by the elastic unit 90 to restore to the original position, which prevents the first cushioning plate 70 from axially extruding the second cushioning plate 80. Thereby, the service life of the second cushioning plate 80 can be further prolonged.

The present invention further provides a film wrapping machine, and the film wrapping machine has the heat sealing device of the preferred embodiment having the cushioning mechanism 6, and the film wrapping machine also has other devices and mechanisms of the conventional film wrapping machine to cooperate with the above-mentioned heat sealing device. Therefore, the film wrapping machine of the present invention is more convenient to be assembled and maintained compared to film wrapping machines with the conventional cushioning mechanism.

Through the foregoing paragraphs, the preferred embodiments and detailed descriptions thereof are described for presenting the technical means adopted by the present invention to solve the problem, not to constrain the scope of the claimed invention. Anything that is literally consistent with the claims of the present invention and variations and modifications that are equivalent to the claims are encompassed by the scope of the claims of the present invention.

What is claimed is:

1. A cushioning mechanism comprising:
a leading cylinder;
an elastic unit being elastically deformable under compression;
a first cushioning plate rotating synchronously with the leading cylinder;
a second cushioning plate; and at least one cushioning component having
   a cushioning groove having
      a first groove wall located on one of two opposite sides of the cushioning groove and extending from a bottom of the cushioning groove along an axial direction of the leading cylinder; and
      a second groove wall located on the other one of the two opposite sides of the cushioning groove, extending from the bottom of the cushioning groove, and extending obliquely relative to the axial direction of the leading cylinder; and
   a cushioning protrusion matching the cushioning groove;
wherein the elastic unit, the first cushioning plate, and the second cushioning plate are sequentially disposed on the leading cylinder along the axial direction of the leading cylinder, and two opposite ends of the elastic unit respectively abut the first cushioning plate and the leading cylinder; the cushioning groove and the cushioning protrusion are respectively formed on the first cushioning plate and the second cushioning plate; when the second cushioning plate is rotated to allow the cushioning protrusion to press the first groove wall, the first cushioning plate, the second cushioning plate, and the leading cylinder rotate synchronously; when the second cushioning plate is rotated to allow the cushioning protrusion to press the second groove wall, the second cushioning plate rotates relative to the first cushioning plate and pushes the first cushioning plate to move along the axial direction of the leading cylinder and compress the elastic unit.

2. The cushioning mechanism as claimed in claim 1, wherein the cushioning mechanism has multiple said cushioning components.

3. The cushioning mechanism as claimed in claim 2, wherein the cushioning mechanism has an elastic ring disposed between and abutting against the first cushioning plate and the second cushioning plate.

4. The cushioning mechanism as claimed in claim 1, wherein the first cushioning plate and the second cushioning plate are made of self-lubricating material.

5. The cushioning mechanism as claimed in claim 4, wherein the cushioning mechanism has an elastic ring disposed between and abutting against the first cushioning plate and the second cushioning plate.

6. The cushioning mechanism as claimed in claim 1, wherein the cushioning mechanism has an elastic ring disposed between and abutting against the first cushioning plate and the second cushioning plate.

7. A heat sealing device comprising:
a driver;
two gripping boards;
a transmission mechanism connected to the driver and the two gripping boards and having
   a transmission wheel configured to be rotated by the driver; and
   a transmission shaft configured to drive the two gripping boards to approach each other or depart from each other; and
the cushioning mechanism as claimed in claim 1;
wherein the second cushioning plate and the transmission wheel rotate synchronously, and the leading cylinder and the transmission shaft rotate synchronously.

8. The heat sealing device as claimed in claim 7, wherein the cushioning mechanism has multiple said cushioning components.

9. The heat sealing device as claimed in claim 8, wherein the cushioning mechanism has an elastic ring disposed between and abutting against the first cushioning plate and the second cushioning plate.

10. The heat sealing device as claimed in claim 7, wherein the first cushioning plate and the second cushioning plate are made of a self-lubricating material.

11. The heat sealing device as claimed in claim 10, wherein the cushioning mechanism has an elastic ring disposed between and abutting against the first cushioning plate and the second cushioning plate.

12. The heat sealing device as claimed in claim 7, wherein the cushioning mechanism has an elastic ring disposed between and abutting against the first cushioning plate and the second cushioning plate.

13. A film wrapping machine comprising the heat sealing device as claimed in claim 7.

14. The film wrapping machine as claimed in claim 13, wherein the cushioning mechanism has multiple said cushioning components.

15. The film wrapping machine as claimed in claim 14, wherein the cushioning mechanism has an elastic ring disposed between and abutting against the first cushioning plate and the second cushioning plate.

16. The film wrapping machine as claimed in claim 13, wherein the first cushioning plate and the second cushioning plate are made of a self-lubricating material.

17. The film wrapping machine as claimed in claim 16, wherein the cushioning mechanism has an elastic ring disposed between and abutting against the first cushioning plate and the second cushioning plate.

18. The film wrapping machine as claimed in claim 13, wherein the cushioning mechanism has an elastic ring disposed between and abutting against the first cushioning plate and the second cushioning plate.

* * * * *